United States Patent [19]
Kusano et al.

[11] Patent Number: 5,583,411
[45] Date of Patent: Dec. 10, 1996

[54] SYNCHRONOUS MOTOR CONTROL SYSTEM FOR ELECTRIC VEHICLE

[75] Inventors: Katsuyuki Kusano; Yasushi Kanai; Akishiro Takeuchi; Yuji Saito, all of Saitama, Japan

[73] Assignee: Honda Giken Kogyo Kabushiki Kaisha, Tokyo, Japan

[21] Appl. No.: 103,492

[22] Filed: Aug. 4, 1993

[30] Foreign Application Priority Data

Aug. 4, 1992 [JP] Japan .................................. 4-227956

[51] Int. Cl.$^6$ ........................................................ H02P 7/00
[52] U.S. Cl. ............................. 318/719; 318/432; 318/376
[58] Field of Search .................................. 318/376, 378, 318/798–817, 432, 437, 300, 716–719, 490, 560, 254, 138, 626, 629, 632, 616, 139; 363/34, 39, 40, 44, 55, 56, 27; 180/170, 171, 242, 244, 65.1, 65.3, 65.8

[56] References Cited

U.S. PATENT DOCUMENTS

| | | | |
|---|---|---|---|
| 4,306,156 | 12/1981 | Monaco et al. | 318/139 X |
| 4,311,949 | 1/1982 | Pelkmann et al. | 318/799 |
| 4,651,068 | 3/1987 | Meshkat-Razavi | 318/254 |
| 4,714,400 | 12/1987 | Barnett et al. | 318/85 |
| 4,825,055 | 4/1989 | Pollock | 318/560 |
| 4,829,234 | 5/1989 | Gretsch | 318/490 |
| 4,831,318 | 5/1989 | Yausa et al. | 318/626 |
| 5,182,508 | 1/1993 | Schauder | 318/801 |
| 5,227,703 | 7/1993 | Boothe et al. | 318/139 |
| 5,274,313 | 12/1993 | Armhein | 318/629 |

FOREIGN PATENT DOCUMENTS 53-58610   5/1978   Japan.
63-302789  12/1988  Japan.

OTHER PUBLICATIONS

English Language Abstract of JP references listed above.

*Primary Examiner*—Jonathan Wysocki
*Attorney, Agent, or Firm*—Lyon & Lyon

[57] ABSTRACT

A synchronous motor control system controls a synchronous motor on an electric vehicle for propelling the electric vehicle in a propulsive mode or regenerating electric energy in a regenerative model. The synchronous motor control system has a rotational speed sensor for detecting a rotational speed of the synchronous motor, an accelerator for producing a torque command signal, and a driver connected between a battery on the electric vehicle and the synchronous motor for operating the synchronous motor in either the propulsive mode or the regenerative mode. A controller is responsive to the rotational speed detected by the rotational speed sensor and the torque command signal produced by the accelerator for controlling the driver to operate the synchronous motor in either the propulsive mode or the regenerative mode. The controller has maps for storing lead and lag values which are selectively readable to control the driver to operate the synchronous motor with a maximum efficiency based on two parameters of operation of the electric vehicle, namely, the rotational speed of the motor and the torque command from the accelerator.

14 Claims, 2 Drawing Sheets

5,583,411

SYNCHRONOUS MOTOR CONTROL SYSTEM FOR ELECTRIC VEHICLE

BACKGROUND OF THE INVENTION

1. Field of the Invention

The present invention relates to a system for controlling the synchronous motor of an electric vehicle.

2. Description of the Related Art

There have been known synchronous motor Control systems for electric vehicles. The known synchronous motor control systems control energizing currents by way of pulse width modulation to energize a synchronous motor to propel the electric vehicle, i.e., to operate the synchronous motor in propulsive mode, or to regenerate electric energy from the synchronous motor, i.e., to operate the synchronous motor in a regenerative mode, based on a commutation signal which is in phase with the rotation of the synchronous motor.

However, the conventional synchronous motor control systems for electric vehicles produce output commands in timed relationship to the commutation signal that is detected by a commutation sensor, i.e., a rotational speed sensor, when the synchronous motor is in the propulsive or regenerative mode, and hence do not effect any special control process for producing a lead or lag in phase. Therefore, in the event that the rotational speed of the synchronous motor varies, the currents of the synchronous motor vary in phase because counterelectromotive forces are induced across the coils of the synchronous motor and the reactances of the coils change due to a frequency change. When the currents of the synchronous motor vary in phase, the synchronous motor is caused to rotate out of synchronism, and the efficiency thereof is lowered though the synchronous motor can be operated in the propulsive or regenerative mode.

Since the electric vehicles employ a vehicle mounted battery as a source of electric energy to be supplied to the synchronous motor, the lowered efficiency of the synchronous motor results in a reduction in the distance that the electric vehicles can travel after the battery has been fully charged in a single charging cycle. Consequently, the conventional synchronous motor control systems have not been satisfactory for controlling the synchronous motors of electric vehicles.

SUMMARY OF THE INVENTION

It is therefore an object of the present invention to provide a synchronous motor control system for controlling electric currents supplied to a synchronous motor on an electric vehicle to lead or lag to an appropriate extent with respect to the rotational speed of the synchronous motor, so that the synchronous motor can be operated in a propulsive or regenerative mode highly efficiently, and hence the electric vehicle can travel an increased distance after the battery on the electric vehicle has been fully charged in a single charging cycle.

According to the present invention, there is provided a synchronous motor control system for an electric vehicle, comprising a synchronous motor on the electric vehicle for propelling the electric vehicle in a propulsive mode or regenerating electric energy in are generative mode, a battery mounted on the electric vehicle, a rotational speed sensor for detecting the rotational speed of the synchronous motor, an accelerator for producing a torque command signal, a driver connected between the battery and the synchronous motor, for operating the synchronous motor in either the propulsive mode or the regenerative mode, and control means responsive to the rotational speed detected by the rotational speed sensor and the torque command signal produced by the accelerator, for controlling the driver to operate the synchronous motor in either the propulsive mode or the regenerative mode, the control means having map means for storing lead and lag values which are selectively readable to control the driver to operate the synchronous motor with a maximum efficiency based on two parameters of operation of the electric vehicle.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
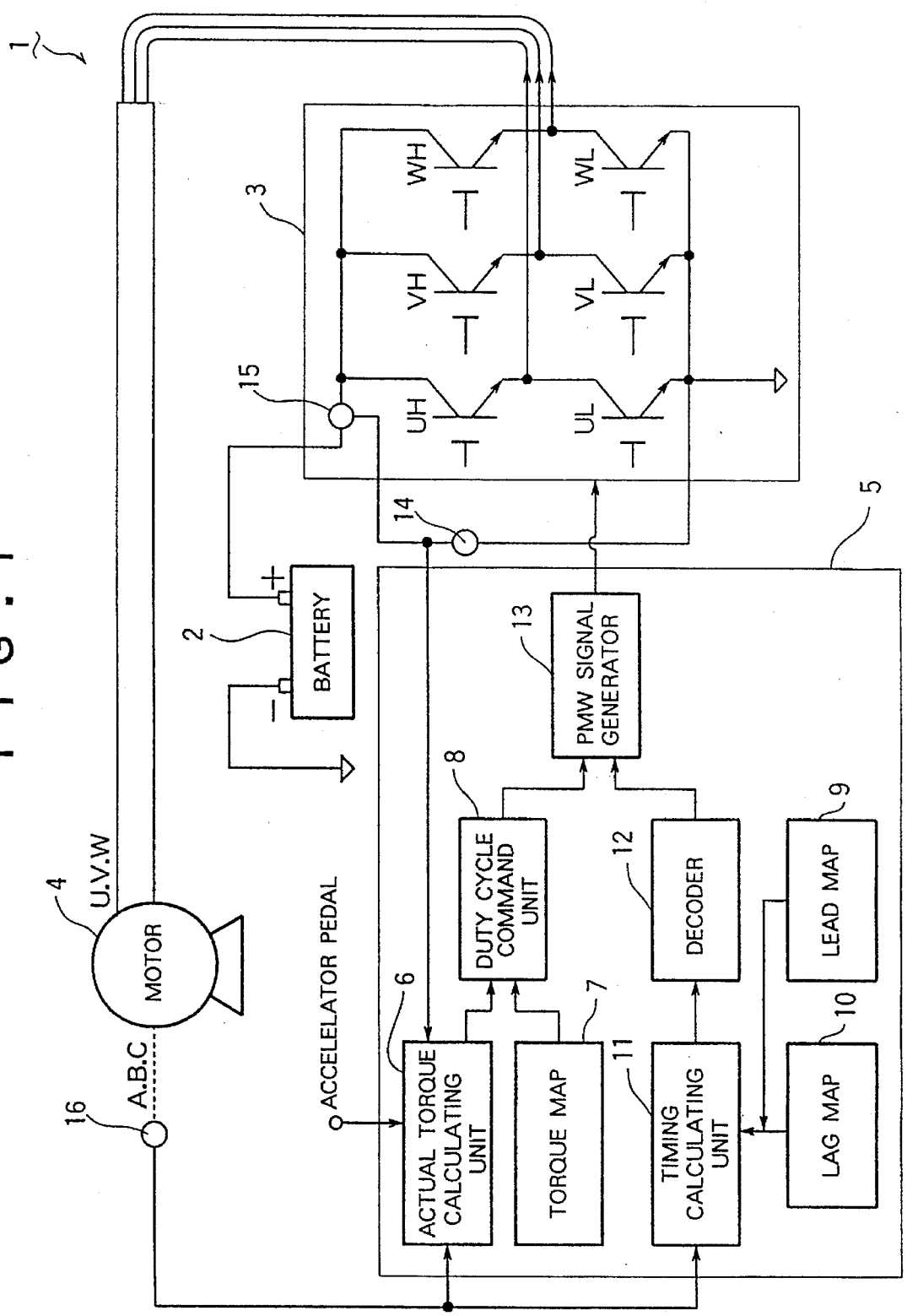
FIG. 1 is a block diagram of a synchronous motor control system for an electric vehicle according to the present invention.

As shown in FIG. 1, a synchronous motor control system 1 for an electric vehicle according to the present invention generally comprises a battery 2 for outputting a DC voltage of 200 volts, a driver 3, a synchronous motor 4, and a controller 5. The battery 2, the driver 3, the synchronous motor 4, and the controller 5 are mounted on the electric vehicle.

The controller 5 comprises an actual torque calculating unit 6, a torque map 7, a duty cycle command unit 8, a lead map 9, a lag map 10, a timing calculating unit 11, a decoder 12, and a PWM (pulse width modulation) signal generator 13.

The synchronous motor 4 is connected through the driver 3 to the battery 2. The synchronous motor 4 can be operated in a propulsive mode, i.e., can be energized by currents supplied from the driver 3 to propel the electric vehicle, and can also be operated in a regenerative mode, i.e., can regenerate electric energy that may be supplied to the driver 3 to charge the battery 2.

The driver 3 comprises a plurality of switching transistors UH, UL, VH, VL, WH, WL that are successively turned on and off by pulse-width-modulated command signals supplied from the controller 5 thereby to convert the DC voltage supplied from the battery 2 into three-phase AC voltages, which are applied to the synchronous motor 4. Accordingly, the Synchronous motor 4 is energizable by the electric energy supplied from the battery 2 through the driver 3.

The voltage and current supplied from the battery 2 to the driver 3 are detected by a voltmeter 14 and an ammeter 15, respectively. The detected voltage and current are supplied to the actual torque calculating unit 6, which multiplies the detected voltage and current to calculate the electric power supplied to the driver 3.

A torque command signal is produced by the accelerator pedal on the electric vehicle, and is proportional to the depth to which the accelerator pedal is depressed. The actual torque calculating unit 6 calculates an actual torque to be produced by the synchronous motor 4, based on the torque command signal taking into account the calculated electric power supplied to the driver 3 and an output signal from a commutation sensor, i.e., a rotational speed sensor, 16 coupled to the synchronous motor 4. The calculated actual torque is inputted to the duty cycle command unit 8.

The torque map 7, which is stored in a ROM (read only memory) or the like contains a list of duty cycle command signals that have experimentally been determined as corresponding to actual torques as a parameter, specifically torque command signals from the accelerator pedal, rotational speeds of the synchronous motor 4, and calculated electric powers, for minimizing the output current from the battery 2.

The duty cycle command unit 8 determines a duty cycle command signal from the torque map 7 based on the actual torque calculated by the actual torque calculating unit 6, and supplies the determined duty cycle command signal to the PWM signal generator 13.

Figure 2:
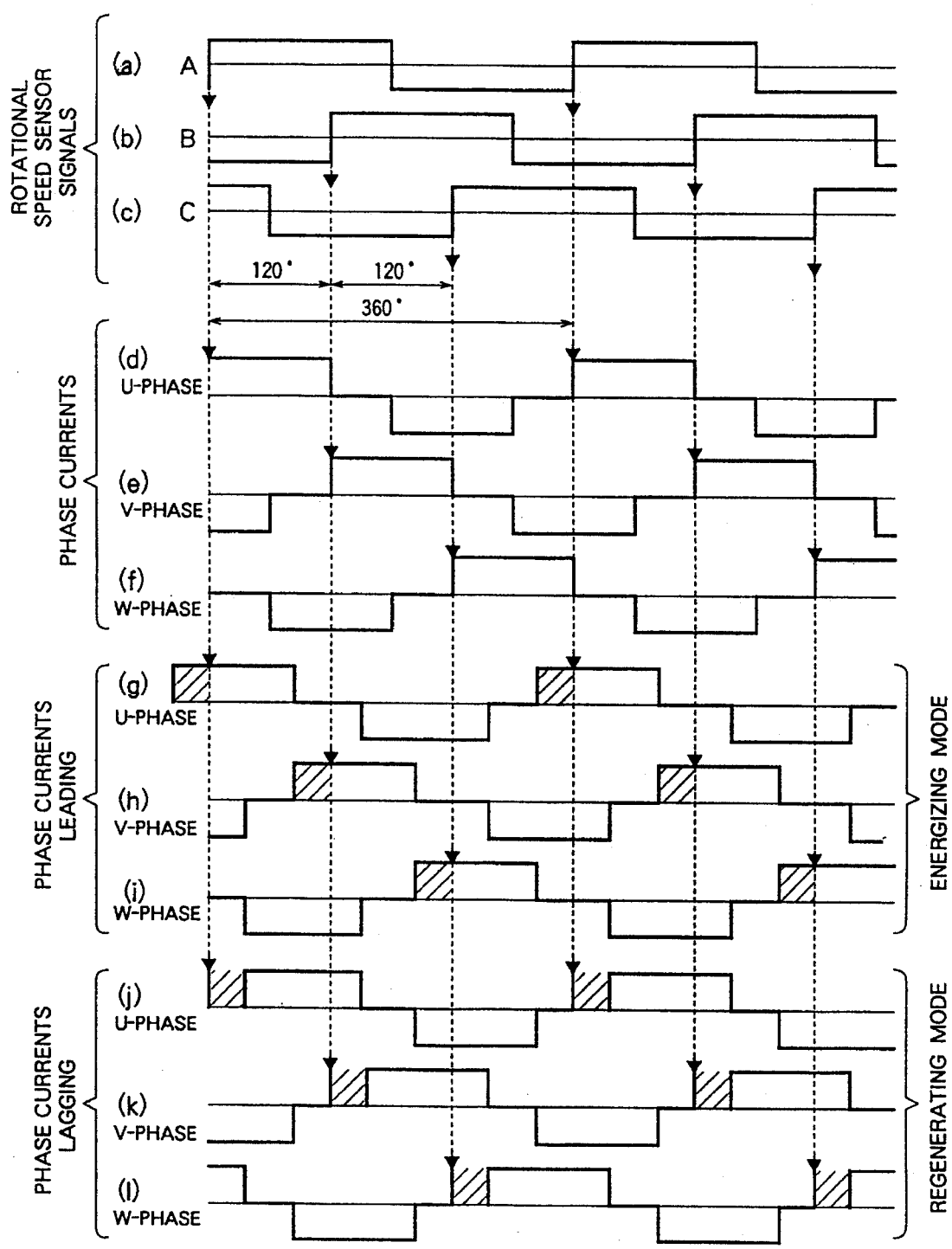
FIG. 2 is a timing chart of rotational speed sensor signals and phase currents, showing the manner in which the synchronous motor control system shown in FIG. 1 operates.

The rotational speed sensor 16 comprises three sensor elements A, B, C for detecting the magnetic fluxes (see FIG. 2 at (a), (b), and (c)) of U-, V-, W-phases of the synchronous motor 4 through which respective phase currents flow (see FIG. 2 at (d), (e), and (f)). Therefore, the rotational speed sensor 16 detects the angular position of the rotor thereof for thereby detecting the rotational speed of the synchronous motor 4. The flux signals from the sensor elements A, B, C, as indicating the rotational speed of the synchronous motor 4, are supplied to the actual torque calculating unit 6 and the timing calculating unit 11.

The timing calculating unit 11 calculates time to generate PWM signals based on the flux signals from the sensor elements A, B, C and lead or lag information supplied from the lead map 9 or the lag map 10.

The lead and lag maps 9, 10, which are stored in a ROM or the like contains a list of lead values and a list of lag values, respectively, that have experimentally been determined as corresponding to rotational speeds of the synchronous motor 4 and torque command signals from the accelerator pedal, for maximizing the efficiency of the synchronous motor 4. When a certain rotational speed and a certain torque command signal are supplied as parameters to the lead map 9 or the lag map 10, the lead map 9 or the lag map 10 determines a corresponding lead or lag for the phase currents (see FIG. 2 at (g)–(1)) according to a search or look-up process and an interpolation process based on the supplied parameters. Then, the lead map 9 or the lag map 10 supplies the determined lead or lag to the timing calculating unit 11.

Specifically, when the synchronous motor 4 is operated in the propulsive mode, the timing calculating unit 11 produces data to advance phase-current commands (see FIG. 2 at (g)–(i)) to be supplied to the synchronous motor 4 with respect to the rotational speed signal from the rotational speed sensor 16.

When the synchronous motor 4 is operated in the regenerative mode, the timing calculating unit 11 produces data to delay phase-current commands (see FIG. 2 at (j)–(1)) to be supplied to the synchronous motor 4 with respect to the rotational speed signal from the rotational speed sensor 16.

The decoder 12 decodes the data from the timing calculating unit 11, and supplies the decoded data as a timing command signal to the PWM signal generator 13.

The PWM signal generator 13 generates pulse-width modulated signals based on the duty cycle command signal from the duty cycle command unit 8 and the timing command signal from the decoder 12. The pulse-width-modulated signals generated by the PWM signal generator 13 are applied to the driver 3 to turn on and off the switching transistors UH, UL, WH, VL, WH, WL.

In the propulsive mode, the driver 3 supplies controlled phase currents to the synchronous motor 4 to energize the synchronous motor 4.

In the regenerative mode, the driver 3 charges the battery 2 with electric energy that is supplied from the synchronous motor 4 through the switching transistors UH, UL, VH, VL, WH, WL that are controlled by the pulse-width modulated signals from the PWM signal generator 13.

Accordingly, the phase currents of the synchronous motor 4 are controlled by a feedback loop to lead or lag to an optimum extent to achieve a maximum efficiency of the synchronous motor 4 depending on the depth to which the accelerator pedal is depressed.

Since the synchronous motor 4 can be operated highly efficiently with an optimum lead or lag in the phase currents with respect to the rotational speed of the synchronous motor 4, the distance that the electric vehicle can travel per full battery charging cycle is increased. Thus, the electric vehicle with the synchronous motor control system is rendered highly economical. Furthermore, the various components of the synchronous motor control system undergo a reduced burden because it can energize the synchronous motor 4 with reduced currents for a maximum output power.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. the scope of the invention is indicated by the appended claims rather than by the foregoing description.

What is claimed is:

1. A synchronous motor control system for an electric vehicle comprising:

a synchronous motor on the electric vehicle for propelling the electric vehicle in a propulsive mode or regenerating electric energy in a regenerative mode;

a battery on the electric vehicle;

a rotational speed sensor for detecting a rotational speed of said synchronous motor;

an accelerator for producing a torque command signal;

a driver connected between said battery and said synchronous motor for operating said synchronous motor in either said propulsive mode or said regenerative mode; and control means responsive to the rotational speed detected by said rotational speed sensor and the torque command signal produced by said accelerator for controlling said driver to operate said synchronous motor in either said propulsive mode or said regenerative mode, said control means comprising a single control loop between the rotational speed sensor and said driver, and having map means for storing lead and lag phase values corresponding to rotational speeds of the motor and torque command signals from the accelerator which are selectively readable to control said driver to operate said synchronous motor of the electric vehicle.

2. A synchronous motor control system according to claim 1, wherein said control means comprises means for controlling said driver to operate said synchronous motor in said propulsive mode with phase currents leading in phase by one of said lead values read from said map means.

3. A synchronous motor control system according to claim 1, wherein said control means comprises means for controlling said driver to operate said synchronous motor in said regenerative mode with phase currents lagging in phase by one of said lag values read from said map means.

4. A synchronous motor control system according to claim 1, wherein said driver comprises a plurality of switching elements connected between said battery and said synchronous motor, said control means comprising means for generating and applying pulse-width-modulated signals to said switching elements and means for supplying data to control said pulse-width-modulated signals in timing based on one of said lead and lag values read from said map means.

5. A synchronous motor control system for a synchronous motor in an electric vehicle for moving the electric vehicle by electric energy supplied by a battery on the electric vehicle in response to an accelerator pedal, comprising:

means for detecting a rotational speed of the synchronous motor;

means for detecting a torque command signal from the accelerator pedal;

driver means connected between said battery and said synchronous motor for operating said synchronous motor in either a propulsive mode or a regenerative mode; and map means for storing electrical current lead phase values and lag phase values corresponding to rotational speeds of the motor and torque command signals from the accelerator pedal;

controls means for reading a phase value from said map means in response to said detected rotational speed and detected torque command signal for controlling said driver means, said control means comprising a single control loop from the means for detecting a rotational speed to the driver means, to operate the synchronous motor in either said propulsive mode or said regenerative mode with said read phase value.

6. A synchronous motor control system according to claim 5, wherein said map means comprises a pair of maps containing said electrical current lead and lag phase values, respectively.

7. A synchronous motor control system according to claim 5, wherein said control means includes means for controlling said driver to operate said synchronous motor in said propulsive mode with phase currents leading in phase by one of said lead phase values read from said map means.

8. A synchronous motor control system according to claim 5, wherein said control means includes means for controlling said driver to operate said synchronous motor in said regenerative mode with phase currents lagging in phase by one of said lag phase values read from said map means.

9. A synchronous motor control system according to claim 5, wherein said driver comprises a plurality of switching elements connected between said battery and said synchronous motor, said control means comprising means for generating and applying pulse-width-modulated signals to said switching elements and means for supplying dam to control said pulse-width-modulated signals in timing based on one of said lead and lag phase values read from said map means.

10. In a synchronous motor control system for a synchronous motor propelling an electric vehicle having a battery for supplying electric current to the synchronous motor and an accelerator pedal for controlling speed of the electric vehicle, the improvement comprising:

means for detecting a rotational speed of the synchronous motor;

means for detecting for the position of the accelerator pedal;

map means for storing electrical current lead phase values and lag phase values corresponding to rotational speeds of the motor and torque command signals from the accelerator pedal; and control means responsive to said detected rotational speed and the detected position of the accelerator for controlling the operation of the synchronous motor in either a propulsive mode or a regenerative mode by applying a phase leading or a phase lagging, respectively, electric current to the synchronous motor based on phase values from the map means corresponding to said detected rotational speed and accelerator pedal position with said control means comprising a single control loop between the means for detecting a rotational speed and the motor.

11. A synchronous motor control system according to claim 10, wherein map means are provided for determining values of said phase leading or phase lagging electric current based on said detected speed and detected position of the accelerator pedal.

12. A synchronous motor control system according to claim 10, wherein said responsive means includes means for operating the synchronous motor in said propulsive mode with leading phase currents.

13. A synchronous motor control system according to claim 10, wherein said responsive means includes means for operating the synchronous motor in said regenerative mode with lagging phase currents.

14. A method of controlling the operation of a synchronous motor in an electric vehicle for propelling the electric vehicle by a battery in the electric vehicle and controlled by an accelerator pedal, comprising the steps of:

detecting a rotational speed of the synchronous motor;

detecting a position of the accelerator pedal;

retrieving lead or lag phase values from a map, the values corresponding to rotational speeds of the motor and positions of the accelerator pedal; and supplying electrical currents to the synchronous motor in a phase leading mode or a phase lagging mode based only on values selected from the map depending on said detected rotational speed of the synchronous motor and said detected position of the accelerator pedal.

* * * * *